United States Patent
Ioffe et al.

(10) Patent No.: US 8,392,427 B1
(45) Date of Patent: Mar. 5, 2013

(54) LSH-BASED RETRIEVAL USING SUB-SAMPLING

(75) Inventors: Sergey Ioffe, Mountain View, CA (US); Michele Covell, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/248,982

(22) Filed: Sep. 29, 2011

Related U.S. Application Data

(62) Division of application No. 12/237,397, filed on Sep. 25, 2008, now Pat. No. 8,069,176.

(51) Int. Cl.
*G06F 7/00* (2006.01)
(52) U.S. Cl. .................... 707/747; 380/200; 715/723
(58) Field of Classification Search .................. 707/747; 380/200; 715/723
See application file for complete search history.

(56) References Cited

U.S. PATENT DOCUMENTS

| | | | |
|---|---|---|---|
| 2006/0271947 A1* | 11/2006 | Lienhart et al. | 725/19 |
| 2007/0261073 A1 | 11/2007 | Blumenschein et al. | |
| 2009/0052784 A1* | 2/2009 | Covell et al. | 382/209 |
| 2010/0061587 A1 | 3/2010 | Gupta et al. | |

OTHER PUBLICATIONS

Baluja et al., ICASSP 2008, pp. 2137-2140.*
Baluja et al., ICASSP 2007, pp. 213-216.*
Yang et al., ICASSP 2007, pp. 1265-1268.*
Yang, Z. Efficient Video Identificaiton based on locality sensitive hashing and triangle inequality, National University of Singapore, 2005, pp. 1-64.*
United States Office Action, U.S. Appl. No. 13/277,863, Aug. 31, 2012, 11 pages.

* cited by examiner

*Primary Examiner* — Cheyne Ly
(74) *Attorney, Agent, or Firm* — Fenwick & West LLP

(57) ABSTRACT

A set of reference videos is indexed to a reference index in order to facilitate matching of video content. An indexing module receives a set of reference fingerprints representing a set of reference videos and identifies keys contained in the reference fingerprints. Reference identifiers for the reference videos are stored in bins of the reference index associated with the identified keys. The bins in the reference index are sub-sampled to limit the number of reference identifiers stored in a given bin.

12 Claims, 7 Drawing Sheets

| | LSH KEY | REFERENCE INDEX |
|---|---|---|
| | | VIDEO@(OFFSET) |
| BAND 0 | 65 22 A5 B1 | A@(0), C@(7, 142, 156, 253), D@(34, 42, 71, 123, 124, 125)... |
| | B2 72 A5 1C | A@(1), B@(0), C@(1, 12, 14), D@(5), F@(10, 125, 124, 126, 127, ...) |
| | 24 56 39 12 | B@(1) |
| | ... | ... |
| BAND 1 | A5 43 21 C2 | A@(1) |
| | 00 00 00 0A | BL1 |
| | 23 43 44 D2 | A@(0), B@(0), G@(34, 51, 111, 154, 155, 156, 157, 186, 192, 201, ...) |
| | 11 34 55 56 | B@(1) |
| | ... | ... |
| BAND 2 | E1 42 53 22 | A@(0) |
| | 55 21 98 A1 | A@(1) |
| | 11 34 55 56 | B@(0) |
| | 11 53 B4 CA | B@(0) |
| | 00 00 00 0B | BL2 (G, 26) |
| | ... | ... |

LSH-BASED RETRIEVAL USING SUB-SAMPLING

CROSS-REFERENCE TO RELATED APPLICATION

This application is a divisional of U.S. patent application Ser. No. 12/237,397 entitled "LSH-Based Retrieval Using Sub-Sampling," filed Sep. 25, 2008, which is incorporated by reference herein.

BACKGROUND

1. Field of Art

The invention generally relates to an indexing system and more specifically to improving the efficiency of lookup and retrieval from a stored index.

2. Description of the Related Art

Electronic video libraries may contain thousands or millions of video files, making management of these libraries an extremely challenging task. The challenges become particularly significant in the case of online video sharing sites where many users can freely upload video content.

To facilitate searching of a large video database in order to identify and remove copies of videos, the reference videos may be indexed into a searchable reference index. When an input video is received, a lookup is performed on the index to identify reference videos (or portions of reference videos) that have characteristics in common with the input video. Based on the retrieved information, one or more reference videos (or portions of reference videos) can be matched to the input video. A problem occurs when an index lookup returns a very large list of results for a particular input query. In such a situation, the system may be unable to handle the large data flow due to constraints such as processing power, memory, or network bandwidth. A conventional solution to this problem is to blacklist common input queries. Using this technique, input queries that would return long lists of results are omitted and no results are returned. However, blacklisting causes a complete loss of information corresponding to the blacklisted input queries and thus decreases the accuracy of the matching process. What is needed is an efficient lookup and retrieval system that maintains the accuracy of the matching process.

SUMMARY

A system, method and computer program product indexes a set of reference videos. An indexing module receives a set of reference fingerprints. Each reference fingerprint comprises a sequence of fingerprints values that represent a time-localized portion of a reference video. The indexing module identifies keys contained in the reference fingerprints. These keys comprise a subset of the fingerprint values. For each identified key, the indexing module stores reference identifiers identifying reference fingerprints that contain the identified key in a bin associated with the identified key. If the bin stores greater than a predefined threshold number of reference identifiers, a sub-sampling module sub-samples the reference identifiers stored in the bin according to a sub-sampling factor.

Various techniques may be applied to sub-sample the reference identifiers. In one embodiment, reference identifiers are mapped to sampling indices according to a mapping function. Reference identifiers are then sub-sampled based on their sampling index. The mapping function may be based on, for example, an offset index of the reference identifier, a video identifier, a hash computed on the offset index or video identifier, or any combination of the above. In one embodiment, a bin is sub-sampled on a per-video basis, such that reference identifiers corresponding to different videos in a given bin are sub-sampled by a different sub-sampling factor.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE FIGURES

FIG. 3 illustrates an example of a reference video index.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A system, method, and computer program product improves the efficiency of lookup and retrieval by sub-sampling entries in a reference index that are very common. It is noted that, although specific examples are provided in the context of indexing video content, the described system and method can be used for other types of media content indexing such as audio, images, etc. Furthermore, the indexing and lookup techniques described below can be extended to other types of indices other than those used for matching media content such as, for example, document indices or web indices.

Figure 1:
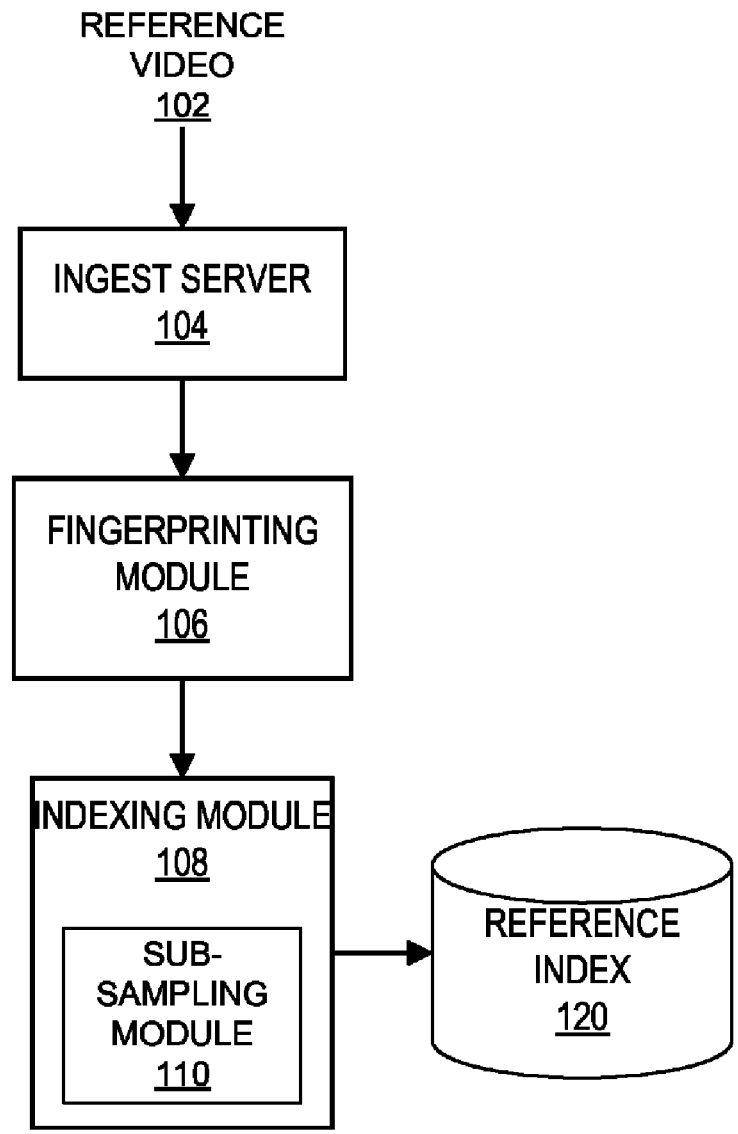
FIG. 1 illustrates an embodiment of a system for generating a reference video index.

An embodiment of a system for indexing video content is illustrated in FIG. 1. An ingest server 104 receives a reference video 102 from a video source. The video source can be, for example, a client computer that communicates with the ingest server 104 through a network. Alternatively, the video source can be a database or other storage device communicatively coupled to the ingest server 104. For example, the video source can be a video storage medium such as a DVD, CD-ROM, Digital Video Recorder (DVR), hard drive, Flash memory, or other memory. The ingest server 104 may also be communicatively coupled to a video capture system such as a video camera, to receive video content.

Figure 2:
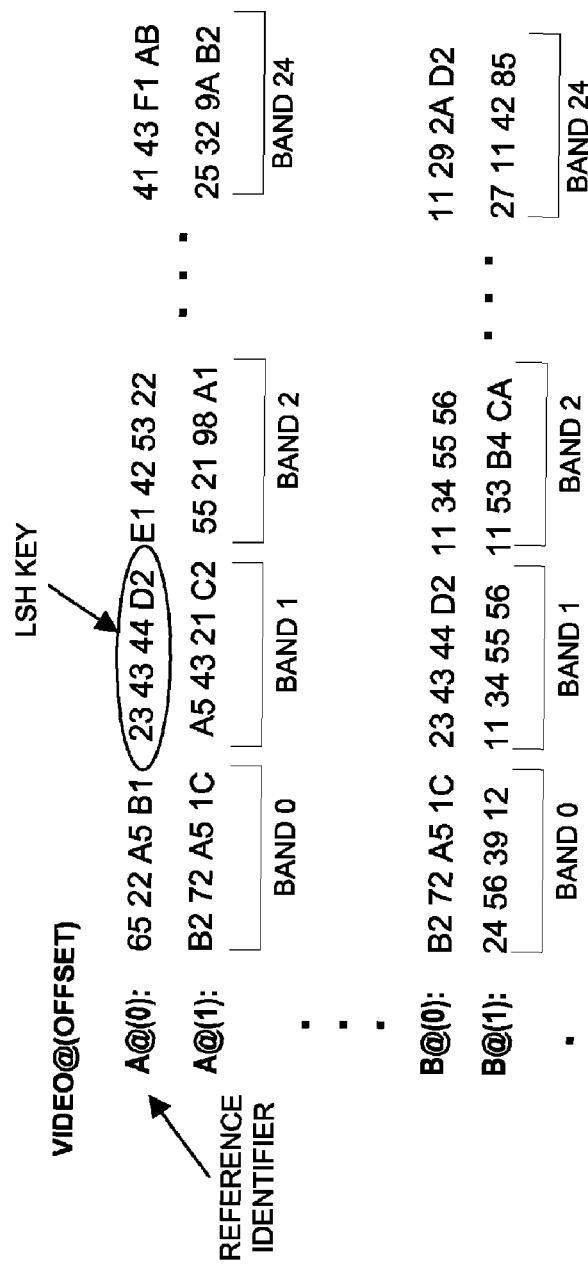
FIG. 2 illustrates examples of reference fingerprints that are indexed according to a Locality Sensitive Hashing process.

The fingerprinting module 106 receives the reference video 102 from the ingest server 104 and generates a "fingerprint" representing the reference video 102. The fingerprint is a bit vector representing, for example, the spatial, temporal, and/or structural characteristics of some or all of the video in a compact format. The fingerprint represents a video based on its visual content such that minor variations due to compression, de-compression, noise, frame rate, start and stop time, source resolutions and so on do not significantly affect the fingerprint. In one embodiment, a fingerprint is generated for each time-localized segment of the reference video 102 (e.g., one fingerprint for every 0.25 seconds of video). Each segment (and its corresponding fingerprint) is identified by a fingerprint identifier identifying the video and an offset into the video of the segment. The offset can be a time offset for the beginning time value of the segment, or an index number indicating a position in the sequence of segments. For example, a video segment and its corresponding fingerprint can be represented using the notation X@(Y), where X is the identifier of a video, and Y is an offset index. Examples of reference fingerprints are illustrated in FIG. 2 and described in further detail below.

An indexing module 108 generates a reference index 120 based on the received reference fingerprints from the fingerprinting module 106. In an alternative embodiment, the indexing module 108 may receive fingerprints for indexing from an external source other than the fingerprint module 106 (e.g., a fingerprint database). Indexing the reference fingerprints provides an efficient mechanism for finding and retrieving a particular fingerprint (or corresponding video segment) based on characteristics of the fingerprint. In one embodiment, the indexing module 108 includes a sub-sampling module 110. The sub-sampling module 110 sub-samples entries in the reference index 120. Sub-sampling the reference index 120 limits the number of results received from the reference index 120 when a lookup is performed on the index 120. This limitation of results advantageously allows lookups to be performed under various processing, memory, and/or bandwidth constraints. Examples of techniques for sub-sampling the reference index 120 are described in further detail below.

In one embodiment, the reference fingerprints are indexed into the reference index 120 using a Locality Sensitive Hashing (LSH) process. FIG. 2 illustrates examples of reference fingerprints for indexing according to an LSH process. Each fingerprint is referenced by a reference identifier indicating the corresponding reference video and segment represented by the fingerprint. For example, fingerprint A@(0) identifies a fingerprint representing the segment of video A at an offset index 0, A@(1) identifies a fingerprint representing the segment of video A at an offset index of 1, and so on. Each fingerprint comprises a sequence of values (e.g., 100 byte values per fingerprint). The sequence of values is divided into a number of LSH bands (band 0, band 1, etc.) with each band corresponding to a subset of values in the fingerprint. For example, LSH band 0 comprises the first four values of the fingerprint; LSH band 1 comprises the next four values of the fingerprint, and so on. In one embodiment, the indexing module 108 divides the fingerprints into 25 LSH bands with each band comprising four byte values. The set of values within a given LSH band is referred to as a "key". For example, fingerprint A@(0) contains the key (23, 43, 44, D2) in LSH band 1. Note that keys in different LSH bands are considered to be unique keys, even if they contain identical values.

FIG. 3 illustrates an embodiment of a reference index 120 that stores sets of reference identifiers in LSH "bins" based on the keys contained in the respective fingerprints identified by the reference identifiers. In a given LSH band, each unique fingerprint key in that band is associated with a different bin in the reference index 120. Each bin stores all reference identifiers corresponding to fingerprints that contain the key associated with that bin. For example, the reference index 120 indicates that the key (65 22 A5 B1) is found in band 0 of the fingerprints A@(0), C@(7), C@(142), C@(156), and so on. Note that keys in different bands have separate bins (and are considered different keys) even if the keys contain identical values. For example, the key 302 in band 1 having values (11 34 55 56) has a separate bin from the key 304 in band 2 having the identical values.

Figure 4:
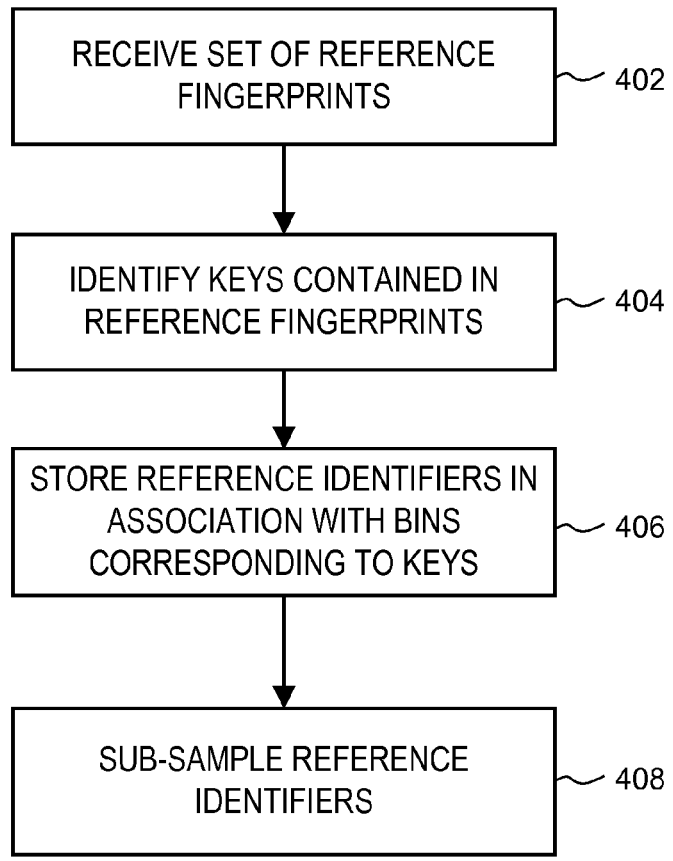
FIG. 4 illustrates a process for indexing a set of reference fingerprints to generate a sub-sampled reference index.

FIG. 4 illustrates an example of a process for indexing reference videos to generate the reference index 120. The indexing module 108 receives 402 a set of reference fingerprints, each representing a time-localized segment from one or more reference videos. A set of "keys" are identified 404 that are contained within the set of fingerprints. Each key is associated with a bin in the reference index 120. Reference identifiers representing the reference fingerprints (and their corresponding reference video segments) are stored 406 in associated with the appropriate bins corresponding to each of the keys contained within the reference fingerprint. The reference identifiers are then sub-sampled 408, if necessary, to reduce the number of reference identifiers stored in the bins. Example processes for sub-sampling reference identifiers are provided below.

Sub-sampling the reference identifiers in the reference index 120 ensures that only a limited number of reference identifiers will be stored in each bin. Without sub-sampling, bins may become highly populated for a variety of reasons. For example, a particular key may represent a characteristic that is common to a large number of videos, or is very common within one particular video. Additionally, the frequency of a particular key may be related to the choice of hashing function used to generate the fingerprints and their respective keys. For example, a poor hashing function may frequently generate a particular key, even if that key does not actually represent a common characteristic of the reference video set. Highly populated bins lead to inefficiencies in the retrieval process because lookups will be performed frequently for these keys, and each lookup returns a long list of values. Thus, the video matching process may become highly inefficient if care is not taken to limit the size of the bins.

In one embodiment, the indexing module 108 sub-samples the bins during the indexing process and only the sub-sampled identifiers are stored in the reference index 120. Alternatively, the indexing module 108 does not sub-sample the bins during the indexing process and the full set of reference identifiers are stored in the reference index 120. Instead, the bins are sub-sampled upon retrieval. In this embodiment, a lookup is performed on a particular bin, and retrieved results are then sub-sampled if the number of identifiers exceeds a predefined threshold. An example of systems and methods for matching an input video to one or more reference videos (or portions of reference videos) using the sub-sampled reference index is now described below.

Figure 5:
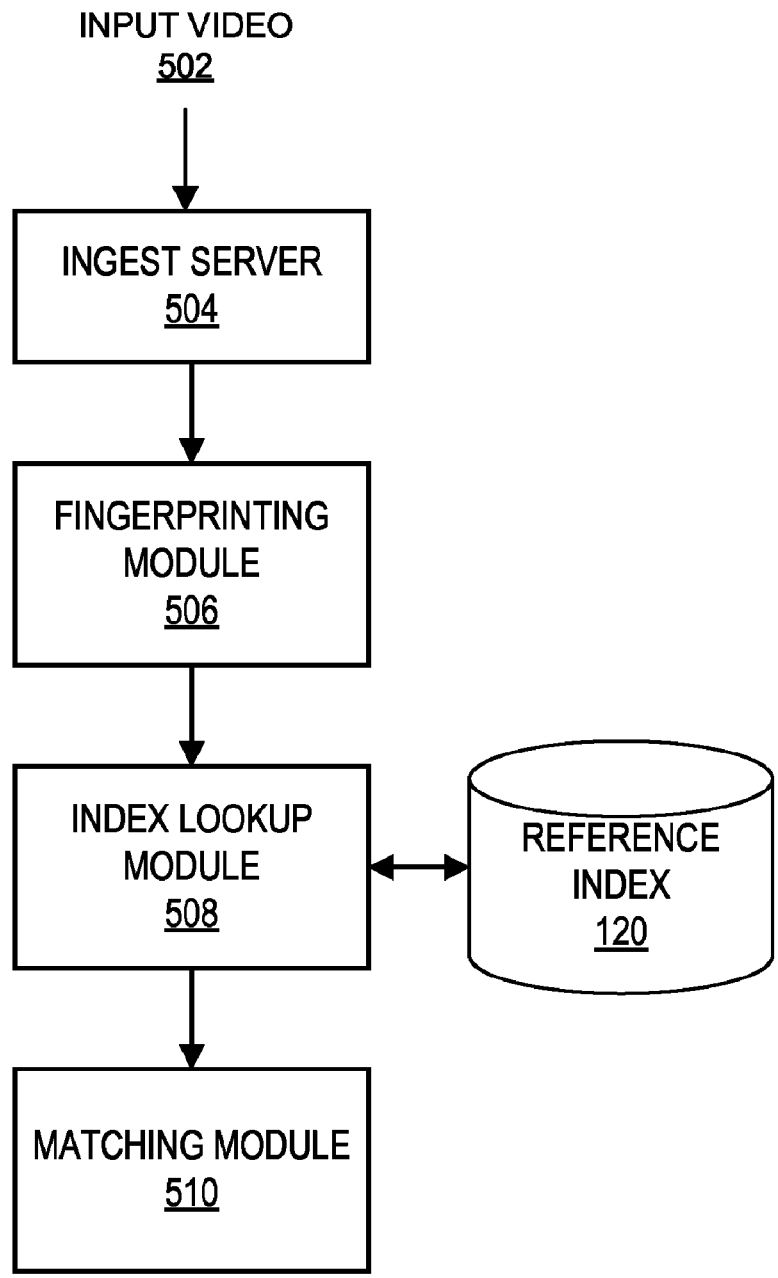
FIG. 5 illustrates an embodiment of a system for performing a lookup in a reference video index for an input video.

FIG. 5 illustrates a system for detecting matching video content by performing lookups on the reference index 120. An ingest server 504 receives an input video for matching against videos indexed in the reference index 120. In one embodiment, the ingest server 504 may be similar or identical to the ingest server 104 for receiving reference videos 102. A fingerprinting module 506 generates fingerprints for the input video 502 using a fingerprinting process similar to that used in generating the reference fingerprints. In one embodiment, the fingerprinting module 506 generates fingerprints for the input video at a rate that is sub-sampled relative to the reference fingerprints of the reference videos. For example, in one embodiment, if the reference fingerprints are generated from the reference videos at a rate of one fingerprint for every 0.25 seconds of video, the input video 502 may be fingerprinted at a rate of one fingerprint per second (i.e. sub-sampled by a factor of 4). An index lookup module 508 executes a lookup on the reference index 120 to retrieve a set of reference identifiers that have reference keys matching the input keys of the input fingerprint. A process for performing a lookup on the reference index 120 is described in more detail below with reference to FIG. 6. Based on the results of the lookup, the matching module 510 determines reference videos, or portions of reference videos, that match at least a portion of the input video.

In one embodiment, the matching module 510 matches the input video 502 to reference videos based on the matches between input keys of the input fingerprint and reference keys of the reference videos. In particular, a reference segment (identified by a reference identifier) may be considered a good candidate match to the input video 502 if there are multiple matches between reference keys in the reference fingerprint and input keys in the input fingerprint. Thus, in one embodiment, the matching module 510 identifies reference identifiers that are stored in bins for at least two different matching keys, and stores these as initial candidate references. The matching module 510 then further analyzes these initial candidate references to determine matches with the input video 502, if any.

Figure 6:
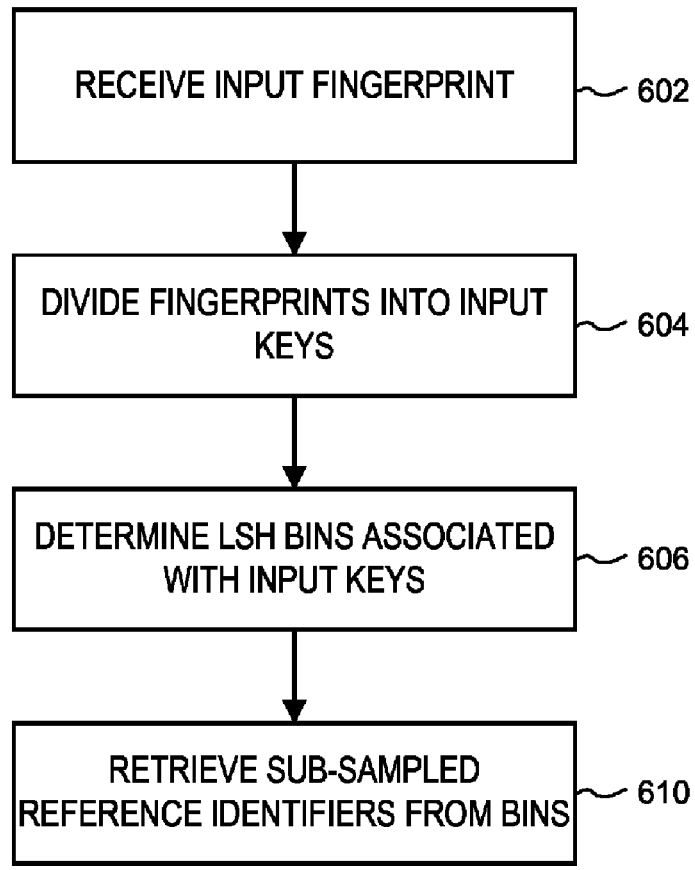
FIG. 6 illustrates an embodiment of a process for performing an LSH-based lookup in a reference index.

FIG. 6 illustrates an embodiment of a process for performing an index lookup on the reference index 120 based on an input fingerprint. An input fingerprint is received 602 and is divided 604 into a number of input keys in different LSH bands (e.g., an input key may be comprised of the 4 values located in a given band). The index lookup module 508 then determines 606 which LSH bins in the reference index 120 are associated with the input keys. A lookup is then performed for each input key using the reference index 120 to retrieve 610 reference identifiers from the bins corresponding to the input keys. As mentioned above, keys that occur frequently in the reference fingerprints will have associated bins in the reference table 120 that are highly populated. Retrieval from such bins may become problematic if, for example, the resulting data exceeds network bandwidth, computation speed, or memory limitations. Thus, the retrieved set of reference identifiers may be a sub-sampled set of reference identifiers.

In one embodiment, LSH bins are sub-sampled to ensure that the number of reference identifiers in that bin is less than a predefined threshold (e.g., less than 100). In one embodiment, the threshold is chosen with regard to factors such as memory, processing, bandwidth constraints. If a bin contains a greater number of identifiers than the threshold, the identifiers in the bin are sub-sampled to bring the number within the limitation. For example, if there are 180 identifiers in a particular bin, the 180 identifiers may be sub-sampled by a factor of 2 so that 50% of the identifiers are kept and 50% are discarded.

One approach to sub-sampling the LSH bins in this manner comprises randomly sub-sampling each bin independently. For example, to randomly sub-sample a bin by a factor of 2, 50% of the identifiers in the bin are randomly selected to be discarded while the other 50% are kept. However, random sub-sampling may result in the loss of valuable information because the goal of the matching process is to find reference identifiers that have matches with two or more input keys. Using the random sub-sampling approach, only $1/K^2$ of the reference identifiers that appear in two different bins prior to sub-sampling will still appear in both bins after sub-sampling, on average, where K is the sub-sampling factor. Thus, a significant number of candidate references may be lost.

An alternative approach to sub-sampling is to correlate sub-sampling across bins based on the reference identifiers. In this approach, rather than randomly sub-sampling each bin independently, it is ensured that reference identifiers that are kept in one bin are also kept in another bin. Using correlated sub-sampling, 1/K of the identifiers that appear in two different bins prior to sub-sampling will still appear in both bins after sub-sampling, on average. This ratio is desirable because the matching process seeks to identify reference fingerprints that have multiple matching keys with the input fingerprint. Thus, using this approach the number of candidate matches found by the matching process will be, on average, sub-sampled by only a factor of K rather than $K^2$.

Correlated sub-sampling may be achieved through probabilistic sampling, arithmetic sampling, or a combination of the two. For example, in one probabilistic approach to correlated sub-sampling, the sub-sampling module 110 first randomly samples the reference identifiers (representing a particular video/offset) in a selected bin (e.g., the first bin) to produce a sample set of reference identifiers. Then, the remaining bins are processed to maintain any reference identifier that matches one of the sampled set and to discard non-matching reference identifiers. Alternatively, one or more reference identifiers from each bin are first selected as the sample set, then each of the bins is processed to retain identifiers matching any of the sampled reference identifiers.

Figure 7:
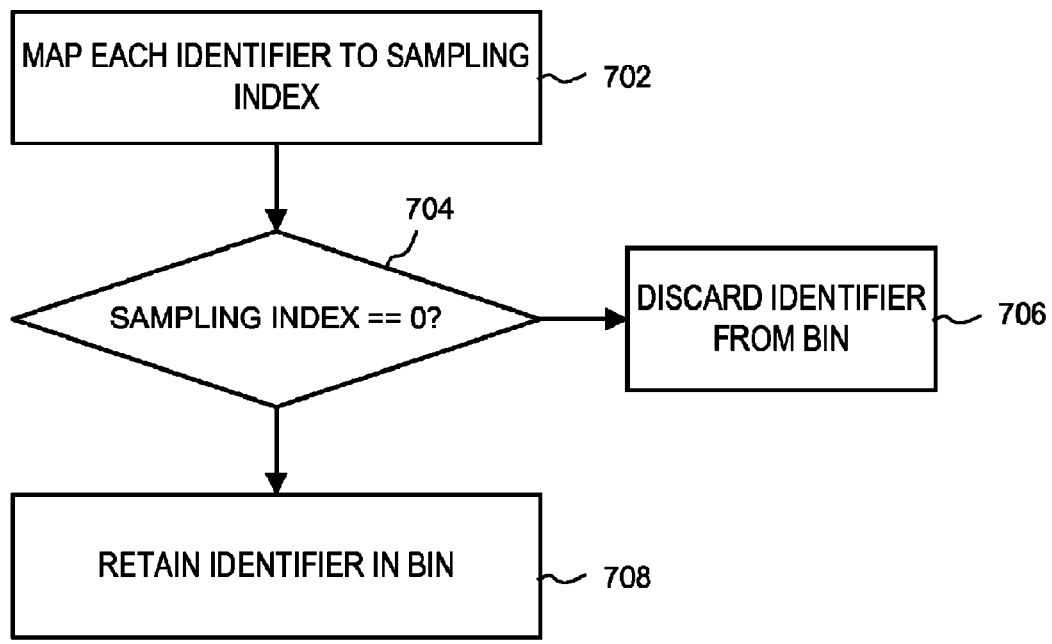
FIG. 7 illustrates an embodiment of a process for sub-sampling reference identifiers in a bin of a reference index.

An example of an arithmetic approach to correlated sub-sampling illustrated in FIG. 7. To sub-sample an LSH bin by a factor of K, each identifier in the bin is mapped 702 to a sampling index between 0 and K−1. The mapping to the sampling index is dependent on the reference identifier and independent of the bin. Thus, a particular reference identifier will always be associated with the same sampling indexing throughout all of the bins containing that reference identifier. The sub-sampling module determines 704 if the sampling index is 0. The reference identifier is retained 706 in the bin if the sampling index is 0, and is otherwise discarded 708. On average, each bin will be sub-sampled by a factor of K, although some bins may be sub-sampled more and some sub-sampled less depending on the distribution of reference identifiers in the bins. Using this approach, an identifier that appears in two bins prior to sub-sampling will be preserved in the first bin if it is preserved in the second, and will be discarded in the first bin if it is discarded in the second.

There are a variety of functions that can be used to provide the mapping of the reference identifier to the sampling index (0 . . . K−1). For example in one embodiment, the sampling index, $I_S$ is computed by $I_S$=offset % K where, offset is the offset index of the reference identifier, K is the sampling factor, and % is the modulo operator. In this embodiment, any reference identifier having an offset that is a multiple of K will be retained, and all other reference identifiers are discarded.

In the above approach, the mapping of the reference identifier to the sampling index is directly correlated to the offset index of the reference identifier. However, this approach may not provide the best performance, depending on the sub-sampling of the input video relative to the reference videos. For example, as mentioned above, fingerprints for reference videos may be generated at a rate of 4 fingerprints per second, while fingerprints for the input video may be generated at a rate of 1 fingerprint per second. If an input video is offset from a reference video by, for example, 0.5 seconds, then the input video will match the reference video at offsets (2, 6, 10, 14, . . . ) of the reference video. However, if the reference identifiers are sub-sampled using, for example, $I_S$=offset % 4, all of the potentially matching offsets will be discarded and a potential match will go undetected. Thus, in some instances, the mapping function may be selected to ensure that the sub-sampling of the reference identifiers is substantially uncorrelated from the sub-sampling of the input video. For example, rather than using a mapping defined by $I_S$=offset % K, a hash function may be computed on the offset, i.e. $I_S$=hash (offset) % K to re-map the identifiers in a way that is not directly correlated with the offset.

In another embodiment, the sampling index $I_S$ is computed by $I_S$=hash(video, offset) % K, where hash(video, offset) is hash function computed on both the video identifier and offset index of the reference identifier. These mappings will give uniform distributions not only over the entire set of offsets but also over all periodically sampled offsets.

In yet another embodiment, the sampling can be based directly on the offset, using $I_S$=offset % K but the sub-sampling K is chosen to be relatively prime to the input sub-sampling interval. For example, if the input video is sub-sampled by a factor of 4, the references may be sub-sampled by a factor of 3, 5, 7 or 9—but typically not 2 or 6.

In yet another embodiment, reference identifiers are mapped to the sampling index, $I_S$ according to the function $I_S$=(offset+C) % K or $I_S$=hash(offset+C) % K, where C is a constant shift value (e.g., C=1). This mapping function shifts the offset to ensure that the reference identifier with an offset of 0 is always discarded. This can be advantageous because the initial frames of a video (corresponding to the offset of 0) often contain standard sequences of frames (e.g., color bars) which can lead to spurious results in the matching process if not removed.

In one embodiment, an incremental approach to sub-sampling is taken. In this approach, bins are first sub-sampled by a first sub-sampling factor. If a bin still exceeds the bin threshold even after initial sub-sampling, the bins can be further sub-sampled, typically in an exponential fashion. For example, the bins are first sub-sampled by a factor of 3. If the bins are determined to still have too many entries, the bins can be sub-sampled by a factor of 9. The sub-sampling factor may increase exponentially, until the number of reference identifiers in the bin drops below the threshold.

In another embodiment, the sub-sampling can be performed on a per-video basis, such that the sub-sampling factor can be different for each video in a bin. Certain LSH keys may be very common in some videos but not in others. For example, in a video containing a slide presentation, the same frame may persist for a long period of time, thus resulting in keys very common to that video, but not necessarily to other videos. In some embodiments, it is therefore desirable to sub-sample occurrences of a particular key within one video, while not penalizing other videos that contain the key. This is useful because such a key will be quite discriminative when determining matches between videos. In one embodiment, the sub-sampling module 110 places a limit on the maximum number of reference identifiers in a particular bin that come from the same video. If the number exceeds the limit, the reference identifiers for that video are sub-sampled. After the per-video sub-sampling has been performed, sub-sampling may then still be performed across the entire bin. For example, the maximum number of reference identifiers for a single video in a given bin can be set to 30. Furthermore, the maximum number of overall reference identifiers for the entire bin can be set to 100. For a given bin, assume there are 21 reference identifiers each for video A, B, C, D, and E and 189 reference identifiers for a video F. To sub-sample the bin, the reference identifiers for video F are first sub-sampled by a factor of 9, resulting in roughly 21 reference identifiers from that video, and reducing the total number of reference identifiers in the bin to roughly 126. Then the set of reference identifiers are selectively sub-sampled by a factor of 3. Specifically, only those reference identifiers which have not been sub-sampled before are sub-sampled the second time. Thus, when sub-sampling the second time, the reference identifiers for videos A, B, C, D, and E get sub-sampled, but F does not get sub-sampled again. This is because all reference identifiers for video F that would be discarded by this second sub-sampling would have already be discarded in the first sub-sampling. This results in roughly 56 total reference identifiers remaining in the bin (roughly 7 reference identifiers for each of videos A, B, C, D, and E and roughly 21 for video F).

In one embodiment, it is further ensured that each video in the bin is sub-sampled according to a sub-sampling factor that is within a power of the sub-sampling factor of the most sub-sampled video. For example, if a video G is sub-sampled by a factor of 27 (i.e. $3^3$), it is ensured that the other videos in the bin are sub-sampled by at least a factor of 9 (i.e., $3^2$). Yet further additional variations of the sub-sampling techniques described above can be implemented as will be apparent to those of ordinary skill in the art.

Although the embodiments presented above are described in the context of video indexing and retrieval, the disclosed indexing and sub-sampling techniques can also be applied to various other applications that utilize search queries on an index. For example, the techniques are applicable to general keyword searches on a document index for documents in a document database. In this example, the reference index stores a mapping of keywords to their locations in a set of document. Each "key" in the reference index 120 corresponds to an individual word (e.g., "dog") in the collection of documents and the reference identifiers correspond to a location in a document (e.g., Doc ID #42, line 53). Thus, a lookup on a given word (e.g., dog) in the index returns a list of all the locations of that word in documents in the document database. Analogous to common video keys, lookups for words that are very common in the document database (e.g., "the") will return very long lists of identifiers indicating the locations of the words. Conventional search engines often do not index such common words as "stop words.". That is, when a query string is entered (e.g., "the lazy yellow dog"), common words are simply ignored. However, rather than not indexing such common words, the techniques of the present invention instead allow such words to be sub-sampled in the reference index. Thus, for a common word (e.g., "the") only a portion of the locations will be retained in reference index while others are discarded. These techniques can be used to improve the efficiency and accuracy of index lookups.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Furthermore, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs stored in a memory and executed by one or more processors. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer-implemented method for retrieving data from a reference index, the method performed by one or more processors, the method comprising:
    receiving an input key comprising a subset of values from an input fingerprint, the input fingerprint representing a time-localized portion of an input video;
    identifying a bin associated with the input key in a reference index table;
    retrieving a set of reference identifiers stored in the bin associated with the input key, the set of reference identifiers identifying time-localized segments of reference videos having reference fingerprints that comprise a reference key matching the input key;
    sub-sampling the set of reference identifiers according to a sub-sampling factor responsive to the bin storing more reference identifiers than a predefined threshold, wherein sub-sampling the reference identifiers comprises:
        applying a hash function to an offset value of a given reference identifier, wherein the offset value identifies the time-localized portion of the given reference video represented by the reference identifier;
        computing a modulus between an output of the hash function and the sampling index;
        responsive to the modulus being a non-zero value, discarding the given reference identifier from the retrieved set of reference identifiers; and
        responsive to the modulus being zero, retaining the given reference identifier in the retrieved set of reference identifiers.

2. The computer-implemented method of claim 1, further comprising:
    identifying at least one reference video as a candidate match for the input video based on the retrieved set of reference identifiers.

3. The computer-implemented method of claim 1, wherein sub-sampling the set of reference identifiers comprises:
    mapping the given reference identifier to a sampling index; and
    determining whether to discard or retain the given reference identifier based on the sampling index.

4. The computer-implemented method of claim 1, wherein the output of the hash function is substantially uncorrelated from the offset value.

5. The computer-implemented method of claim 1, wherein sub-sampling the set of reference identifiers comprises:
    determining a number of reference identifiers associated with a first video in the bin;
    responsive to the number of reference identifiers associated with the first video being greater than a first threshold value, sub-sampling the reference identifiers associated with the first video by a first sub-sampling factor;
    determining a total number of reference identifiers in the bin; and
    responsive to the total number of reference identifiers in the bin being greater than a second threshold value, sub-sampling the retrieved set of reference identifiers by a second sub-sampling factor.

6. The computer-implemented method of claim 5, wherein the second sub-sampling factor is within a power of the first sub-sampling factor.

7. A non-transitory computer readable storage medium storing computer executable code for retrieving data from a reference index, the computer executable program code when executed cause an application to perform steps of:

receiving an input key comprising a subset of values from an input fingerprint, the input fingerprint representing a time-localized portion of an input video;

identifying a bin associated with the input key in a reference index table;

retrieving a set of reference identifiers stored in the bin associated with the input key, the set of reference identifiers identifying time-localized segments of reference videos having reference fingerprints that comprise a reference key matching the input key;

sub-sampling the set of reference identifiers according to a sub-sampling factor responsive to the bin storing more reference identifiers than a predefined threshold, wherein sub-sampling the reference identifiers comprises:

applying a hash function to an offset value of a reference identifier, wherein the offset value identifies the time-localized portion of the reference video represented by the reference identifier;

computing a modulus between an output of the hash function and the sampling index;

responsive to the modulus being a non-zero value, discarding the reference identifier from the retrieved set of reference identifiers; and responsive to the modulus being zero, retaining the reference identifier in the retrieved set of reference identifiers.

8. The non-transitory computer readable storage medium of claim 1, further comprising code for:

identifying at least one reference video as a candidate match for the input video based on the retrieved set of reference identifiers.

9. The non-transitory computer readable storage medium of claim 7, wherein sub-sampling the set of reference identifiers comprises:

mapping the given reference identifier to a sampling index; and determining whether to discard or retain the given reference identifier based on the sampling index.

10. The non-transitory computer readable storage medium of claim 7, wherein the output of the hash function is substantially uncorrelated from the offset value.

11. The non-transitory computer readable storage medium of claim 7, wherein sub-sampling the set of reference identifiers comprises:

determining a number of reference identifiers associated with a first video in the bin;

responsive to the number of reference identifiers associated with the first video being greater than a first threshold value, sub-sampling the reference identifiers associated with the first video by a first sub-sampling factor;

determining a total number of reference identifiers in the bin; and responsive to the total number of reference identifiers in the bin being greater than a second threshold value, sub-sampling the retrieved set of reference identifiers by a second sub-sampling factor.

12. The non-transitory computer readable storage medium of claim 11, wherein the second sub-sampling factor is within a power of the first sub-sampling factor.

* * * * *